(12) United States Patent
Compton (10) Patent No.: US 7,851,688 B2
(45) Date of Patent: Dec. 14, 2010

(54) PORTABLE SOUND PROCESSING DEVICE

(76) Inventor: James M. Compton, 1120 Mulberry St., Williamsport, PA (US) 17701

( * ) Notice: Subject to any disclaimer, the term of this patent is extended or adjusted under 35 U.S.C. 154(b) by 278 days.

(21) Appl. No.: 12/131,034

(22) Filed: May 30, 2008

(65) Prior Publication Data

US 2008/0295672 A1 Dec. 4, 2008

Related U.S. Application Data

(60) Provisional application No. 60/932,825, filed on Jun. 1, 2007.

(51) Int. Cl.
*G10H 1/36* (2006.01)

(52) U.S. Cl. .............................. 84/610; 84/600; 84/609; 84/617; 84/625; 84/634

(58) Field of Classification Search ........................ None
See application file for complete search history.

(56) References Cited

U.S. PATENT DOCUMENTS 5,698,834 A * 12/1997 Worthington et al. .. 235/472.03

2007/0137463 A1 * 6/2007 Lumsden ...................... 84/603
2008/0156173 A1 * 7/2008 Bauer .......................... 84/601
2009/0272251 A1 * 11/2009 Georges et al. ............... 84/609

* cited by examiner

*Primary Examiner*—Marlon T Fletcher
(74) *Attorney, Agent, or Firm*—Riddle Patent Law, LLP; Charles L. Riddle (57) ABSTRACT

A portable sound processing device [1000] designed to retrofit a portable digital player (PDP) such as an iPod sold by Apple, Inc., includes a display [1201] for interacting with a user, a plurality of input devices [1103-1133] for receiving input from a user. The portable sound processing device [1000] has internal or external pre-recorded music which may be mixed with the live input from a musical instrument [3]. The processor [1000] may perform digital signal processing to change the pitch while keeping the tempo the same for pre-recorded music to match the key of the instrument being played. The tempo may be adjusted while not affecting the pitch allowing a musician to practice a song at a slower pace. It may also highlight or remove a specific instrument for practice purposes. The result is a portable signal processing device [1000] which aids music transcription, learning and study.

7 Claims, 9 Drawing Sheets

PORTABLE SOUND PROCESSING DEVICE

CROSS REFERENCE TO RELATED APPLICATIONS

The present application is related to, and claims priority under 37 CFR 1.78(a) of a previously filed patent application "Portable Sound Processing Device" Ser. No. 60/932,825 filed Jun. 1, 2007 by the same inventor, James Compton.

BACKGROUND OF THE INVENTION

1. Field of the Invention

The present invention relates to a portable device for processing music from instruments and pre-recorded sounds.

2. Discussion of Related Art

When learning music, it is difficult to play complex musical pieces while listening and playing with music at its normal speed.

Slowing down the music usually has the effect of reducing the pitch of the music, also making it difficult to play along with, when using an instrument in standard tuning.

Also, since the instrument may have a fixed tuning, it may not harmonize with pre-recorded music played at a fixed key. One way to try to make this mesh is to alter the speed of the prerecorded music. This causes the tempo to not be the same as it was originally intended.

Also, when transcribing and/or learning pre-recorded music, it would be desirable to have the instrument you are studying highlighted (or emphasized) in the pre-recorded music, making it easier to hear among all the other instruments in the recording.

Also, it is desirable to play along with pre-recorded music that has the instrument you are practicing deleted (removed) from the pre-recorded music, leaving all other instruments and sounds.

Also, it would be desirable for the device to provide a removable flash storage option, allowing its song storage capabilities to be easily expanded, versus using a fixed internal drive that is not as easy to upgrade.

Also, it would be desirable for the device to allow its firmware to be easily upgraded (via a USB port, for example), enabling continual improvements of the device's functionality.

Also, it would be desirable for the device to allow users to import custom wavetables for their instrument, enabling them to tailor the instrument sounds to suit their particular needs/tastes.

Also, it would be helpful for the device to behave as an "add-on" product to ipod-like devices that provides an instrument input with effects processing, independent pitch & tempo control of the pre-recorded music and highlighting of specific instruments in the pre-recorded music, extending the functionality of ipod-like devices while leveraging their storage, decoder & user interface capabilities.

A prior art device allows for adjustment of the tempo without changing pitch, or changing the pitch without changing the tempo, however this is only directed to use with a guitar. It does not work effectively for other instruments. It lacks the ability to highlight predefined or user-defined instruments in pre-recorded music. It also lacks connectivity to portable digital player devices (PDPs) such as the ipod sold by Apple, Inc., removable storage, custom wavetable support and the ability to upgrade its firmware.

Currently, there is a need for a portable device which would aid a musician by altering prerecorded music to allow for the musician to efficiently transcribe music and practice an instrument.

SUMMARY OF THE INVENTION

The present invention may be embodied as a portable sound processing device [1000] adapted to retrofit a portable digital player (PDP) [1910] with pre-recorded sounds comprising:
  a) a first codec [1810] for receiving a PDP signal from said PDP [1910] playing the pre-recorded sounds;
  b) a storage device [1401] having stored pre-recorded sounds;
  c) a multiplexer device (MUX) [2010] coupled to the first codec [1810] and the storage device [1401] for selecting the PDP signal or a signal derived from the pre-recorded sounds on the storage device [1401], and producing a MUX signal;
  d) a display [1201] for displaying information to a user;
  e) a plurality of input device [1100] for receiving input from the user;
  f) a second codec [1710] for receiving analog input from a musical instrument [3], converting it to a digital signal, and for converting digital output provided to it to an analog signal;
  g) at least one digital signal processor (DSP) [1610] coupled to MUX [2010] for receiving the MUX signal and for receiving the instrument signal and for digitally processing these signals into a processed signal provided to the second codec [1710];
  h) a master controller unit coupled to the MUX [2010]], storage [1401], PDP [1910] and DSPs [1610, 1620], the user controls [1100] and the display [1201], adapted to interactively:
    i. operate the display [1201] to indicate choices to a user;
    ii. receive input from the user controls [1100] indicating choices of the user;
    iii. operate the MUX [2010] to select a signal indicated by user input;
    iv. operate the DSPs [1610, 1620] to perform a desired signal processing to signals provided to them and play the processed signal.

The present invention may also be embodied as a method of identifying notes played by a musical instrument [3] in pre-recorded music comprising the steps of:
  a) selecting a current note;
  b) identifying a frequency spectrum for said instrument for the current note being the note spectrum;
  c) creating a spectrum mask which passes frequencies where there is an amplitude in the note spectrum greater than a predetermined amplitude;
  d) selecting a specific instant in time of the prerecorded music being a time slice;
  e) identifying a frequency spectrum for the time slice;
  f) masking the frequency spectrum for the time slice with the spectrum mask to create a masked spectrum;
  g) determining if the sum of the amplitudes of the masked spectrum is greater than a predetermined threshold; if so, indicating that the instrument is playing the current note during this time slice;
  h) repeating steps "b"-"g" for a plurality of different current notes i) repeating steps "b"-"h" for a plurality of time slices of the pre-recorded music to result in a determination of which notes of the instrument are being played during the pre-recorded music.

The present invention may also be embodied as a method of highlighting or dimming a specific musical instrument [3] in pre-recorded music comprising the steps of:

a) pre-calculating and storing (in firmware) multiple band pass filters for each known musical instrument to allow highlighting or dimming of these instruments in pre-recorded music;

b) giving each "instrument filter" a name so they may be easily summoned by the user;

c) filtering each original input frame with the instrument filter(s) designed to pass particular frequency bands;

d) applying user-adjustable decibel gains to each band's filtered result to boost or attenuate the band(s) representing the particular instrument's fundamental frequency range and/or its harmonic range;

e) summing the final result to produce a filtered version of the original input frame with the specified instrument being highlighted or dimmed.

OBJECTS OF THE INVENTION

It is an object of the present invention to provide a device which alters tempo of prerecorded music without altering pitch.

It is another object of the present invention to provide a device which alters pitch of prerecorded music without altering tempo.

It is another object of the present invention to provide a portable device which will mix electronic signals from an instrument with pre-recorded sounds.

It is another object of the present invention to highlight a signal from a single sound source (a specific instrument or "voice") in prerecorded music.

It is another object of the present invention to identify and subtract a signal from a single sound source out of prerecorded music.

It is another object of the present invention to identify and subtract a signal from a single sound source out of prerecorded music, then mix in the signal from an instrument being played in real-time.

It is another object of the present invention to provide a removable flash storage option for storing songs.

It is another object of the present invention to allow its firmware to be easily upgraded via an external data port (for example, a USB port).

It is another object of the present invention to allow users to import custom wavetables to tailor their instrument sounds (via waveshaping).

It is another object of the present invention to behave as an "add-on" product to a portable digital player (PDP) such as the ipod sold by the Apple, Inc., extending their functionality to include all objects mentioned above.

BRIEF DESCRIPTION OF THE DRAWINGS

The advantages of the instant disclosure will become more apparent when read with the specification and the drawings, wherein.

DETAILED DESCRIPTION OF THE INVENTION

Theory

When an instrument is being played, it typically produces a base frequency with each additional overtone frequencies. This results in characteristic sound quality of the instrument allowing one to recognize the instrument. For example, a trumpet and a tuba playing the same note will produce different overtones while the base frequency $f_0$ is similar.

A note is the frequency of the most prominent frequency, or the frequency with the largest amplitude. Therefore, a trumpet and tuba will produce multiple frequency peaks on a frequency versus amplitude diagram while playing a single constant note. The base frequency $f_0$ will be centered on the note being played while the other peaks represent the overtones.

The trumpet and tuba both have different overtones and therefore are differentiated by a listener on that basis.

Figure 1:
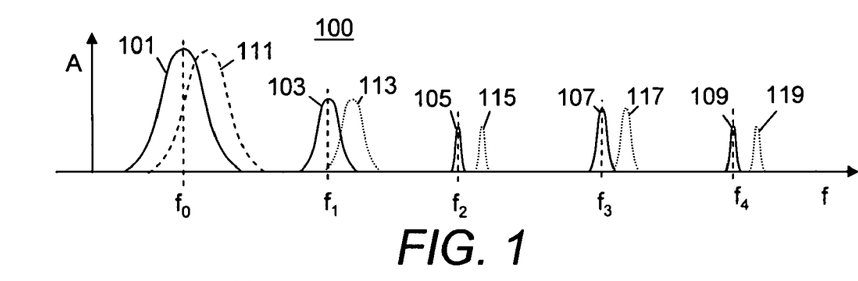
FIG. 1 is a graphic illustration of a frequency spectrum for a specific instrument at an instant in time.

FIG. 1 is a frequency versus amplitude diagram of an instrument showing its frequency spectrum 100. Here it can be seen that the largest peak 101 is at a base frequency $f_0$. There are also peaks 103, 105, 107 and 109 centered at frequencies $f_1$, $f_2$, $f_3$ and $f_4$, respectively. These represent the overtones of the instrument.

Since instruments play different notes, this frequency spectrum, shown in phantom as peaks 111, 113, 115, 117 and 119 represent a higher note which is shifted slightly towards the higher frequencies. However the basic shape of the graph does not change significantly. That is why a person may recognize that the instrument playing several different notes is the same instrument.

Also, many instruments have a finite number of notes when properly tuned where the base frequency ($f_0$) is located at specified frequencies. The spectra having the base frequency ($f_0$) between these specified frequencies is considered off key and avoided.

Therefore, it is theoretically possible to acquire the frequency spectrum of a desired instrument for all notes of the instrument, match these to existing pre-recorded music, then subtract out the spectra throughout the recording to result in a recording without the instrument playing.

The spectra of the instrument to be subtracted out could be pre-stored in memory, or may be sampled from a connected instrument.

Figure 2:
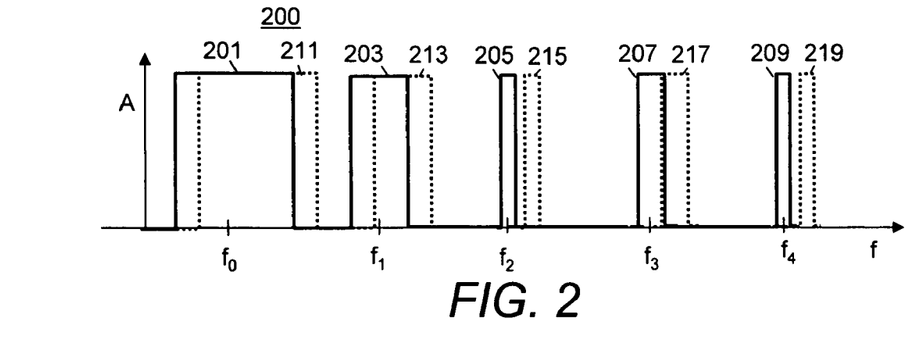
FIG. 2 is a frequency mask used to isolate signals from the instrument of FIG. 1.

FIG. 2 shows a mask 200 used to test if the spectrum of the instrument of FIG. 1 is present. This mask allows all signals in frequency bands 201, 203, 205, 207 and 209, but blocks all signals in other frequency bands. The signal remaining is tested. If it is below a specific amount, then it is determined that the instrument is not playing the note for which the mask 200 was created.

If there is a significant signal, then the note is being played by the instrument. This is repeated for the entire recording, and the mask is shifted to test for different notes. The result is a determination of when the instrument is playing, and what notes it is playing at each time.

Once this is determined, it may be collected as a separate signal and stored. This signal will be the instrument playing alone, without the additional instruments. This may be played to the musician through headphones as a guide signal, as (s)he plays along with the music.

Similarly, the mask 200 is shifted to capture different notes to produce frequency pass bands 211, 213, 215, 217, 219 to match up with peaks 111, 113, 115, 117, 119, respectively of the offset spectrum of FIG. 1.

Alternatively, the inverse of mask 201 may be used to extract all other signals except that of the instrument.

It may also be used to subtract the instrument from the recorded music, so that a musician may play that part live.

In an alternative embodiment, an equalizer may be used to attenuate the amplitude of specified frequency bands.

Figure 3:
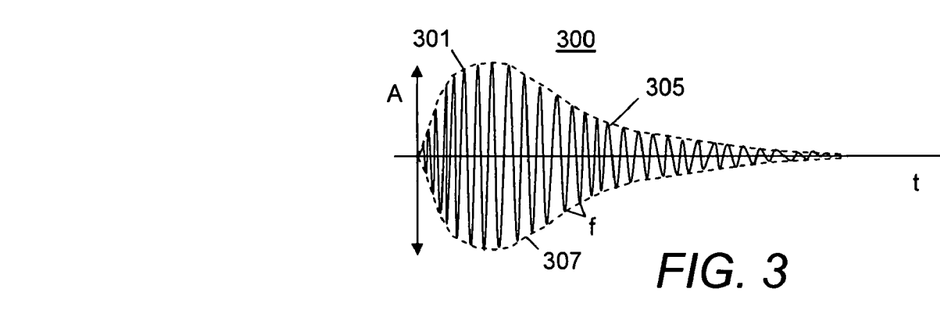
FIG. 3 is an amplitude vs. time graph illustrating a sound wave envelope of the instrument of FIG. 1.

In FIG. 3, a time vs. amplitude diagram is shown for a string instrument. Here is an illustration of a waveform 300 of a string of the instrument that has been plucked. Waveform 300 has a rapid rise in the amplitude 301 which then decays to 305 over a short period of time. The dashed line indicating the extent of the amplitude is the wave "envelope" 307. The initial rise of the amplitude is referred to as the "attack" 301 of the wave envelope 307. All instruments which include a striking or impact to produce a note include a sharp attack. Those such as trumpets, tuba or other wind instrument have less steep attack.

Also, the dissipation 305 of the envelope 307 differs with different instruments.

Therefore, the attack 301, dissipation 305 and other aspects of the envelope known for an instrument may be used in determining if the instrument is being played at a specific instant of a recording being analyzed. These can be used in comparing the waveform 300 of a specific instrument to recorded music. This, along with the methods above, will identify sections of recorded music when a specific instrument is being played. The instrument may then be subtracted out and/or saved as a separate guide signal.

Instrument Highlighting

Digital computer music has a typical sampling rate of 44,100 samples per second, per channel. The frequency spectrum stretches from about 20 Hz or 20 cycles per second (cps) to about 20,000 Hz (20 k cps).

A particular musical instrument in standard tuning will produce fundamental frequencies within a known range. It will also produce harmonics centered at integer multiples of the fundamental frequencies above each fundamental. It is possible to prepare and store arrays of known instruments and their standard fundamental frequency ranges, and their harmonic ranges. A guitar's fundamental range, for example, may range from about 80 Hz to around 1,000 Hz.

Figure 4:
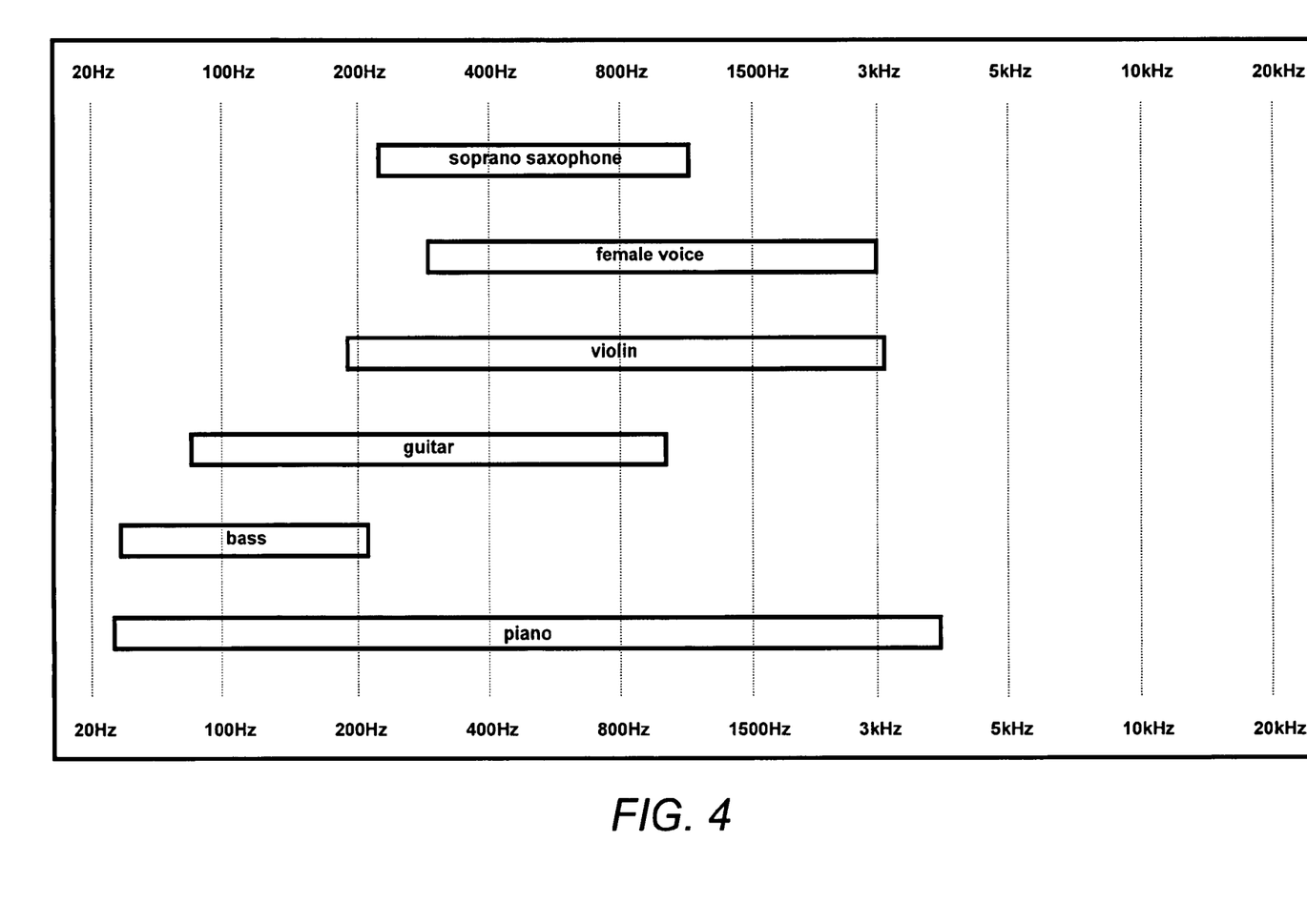
FIG. 4 is an illustration of the sound spectrum showing where the fundamental frequency ranges lie for several musical instruments.

FIG. 4 shows the entire frequency spectrum and where approximate fundamental frequency ($f_0$) ranges lay for several specific instruments. Note that most instruments share portions of their frequency range with other instruments—this overlap is part of the nature of polyphonic music.

An attempt to "highlight" a particular musical instrument in recorded polyphonic music can be made by filtering the original input frames with filters designed to pass particular frequency bands. Each input frame may be filtered with multiple band pass filters, individual gains may be applied to each band's filtered result, and the final result may be summed to produce a filtered version of the original input frame. The band(s) representing the instrument's fundamental frequency range and/or its harmonic range may be boosted by a user-adjustable positive decibel gain, and the instrument will be highlighted.

Conversely, the same instrument may be "dimmed" in polyphonic music by applying negative decibel gains to the band(s) representing the instrument's fundamental frequency range (and/or its harmonic range) prior to the final summation discussed above.

Filters for many instruments may be pre-calculated and stored in firmware of the present invention to allow highlighting and/or dimming of those instruments in pre-recorded polyphonic music. Each "instrument filter" may be given a name so as to be easily summoned by the user, and its decibel gain(s) may be adjusted up or down easily by the user in real-time.

For example, a stored "bass guitar filter" may be switched on that allows the user to boost (or cut) a bass guitar's fundamental frequency range in pre-recorded music by an adjustable decibel amount. The user may for example boost the bass guitar in the recording by +6 decibels. Conversely, the user may for example cut the bass guitar in the recording by −3 decibels.

Custom instrument filters may be defined and/or imported by the user into the present invention, providing a way to highlight or dim previously undefined instruments in the pre-recorded music.

Looping

A digital representation of music to be played may be placed in a memory buffer. Portions of this music may be identified to be played repeatedly. A marker may indicate the beginning and end of the portion to be repeated. A music processor begins at the start marker then plays until an end marker, then continues back at the start marker. This is referred to as "looping". It allows a musician to hear and practice a specific section multiple times.

Pitch Adjustment

A phase vocoder algorithm may be used to allow pitch increases or decreases of the recorded music without altering its tempo. The phase vocoder is a sound analysis/additive synthesis tool that converts an input signal into time varying sets of amplitude and frequency curves, which may be edited and resynthesized to produce various sound transformations, including pitch and/or tempo changes. The phase vocoder is a DSP algorithm that has been in the public domain for decades and is described in detail in various standard signal processing texts.

Tempo Adjustment

A phase vocoder algorithm may be used to allow time compression or expansion of the recorded music without pitch change. See a brief description of the phase vocoder above.

Music Source

The source of the pre-recorded music to be processed by the present invention may be either internal or external, and may be toggled either manually by the user or automatically in device firmware. The present invention may behave as a stand-alone player when the music source is set as internal (and the pre-recorded music is located on a removable flash memory card), or as an "add-on" product to ipod-like devices when the music source is set to external (and the pre-recorded music is located on an ipod-like device connected to the present invention via an external device port).

Interface to Portable Digital Players

The present invention may be made to interface with portable digital players (PDP) such as the ipod sold by the Apple, Inc. An interface that connects to the PDP's accessory port may be provided allowing the present invention to act as an "add-on" product to the PDP. Commands may be sent from a port in the present invention (which may be a UART) to the PDP device via a protocol (which may be a serial protocol) to simulate button presses and control playback of the PDP. The PDP's analog audio output may be routed to a codec in the present invention with an analog to digital converter (ADC) input, and the codec's digital audio output may be sent to one or more digital signal processors DSPs in the present invention. The music may then be buffered in DSP memory and processed in all manners discussed above, extending the ipod-like device's capabilities to include independent pitch & tempo control of the pre-recorded music, highlighting of specific instruments in the pre-recorded music and an instrument input with effects processing.

It is desirable to have most of the signal processing abilities in a portable unit into which one can plug a musical instrument and it may be used to play back and modify the signal.

Figure 5:
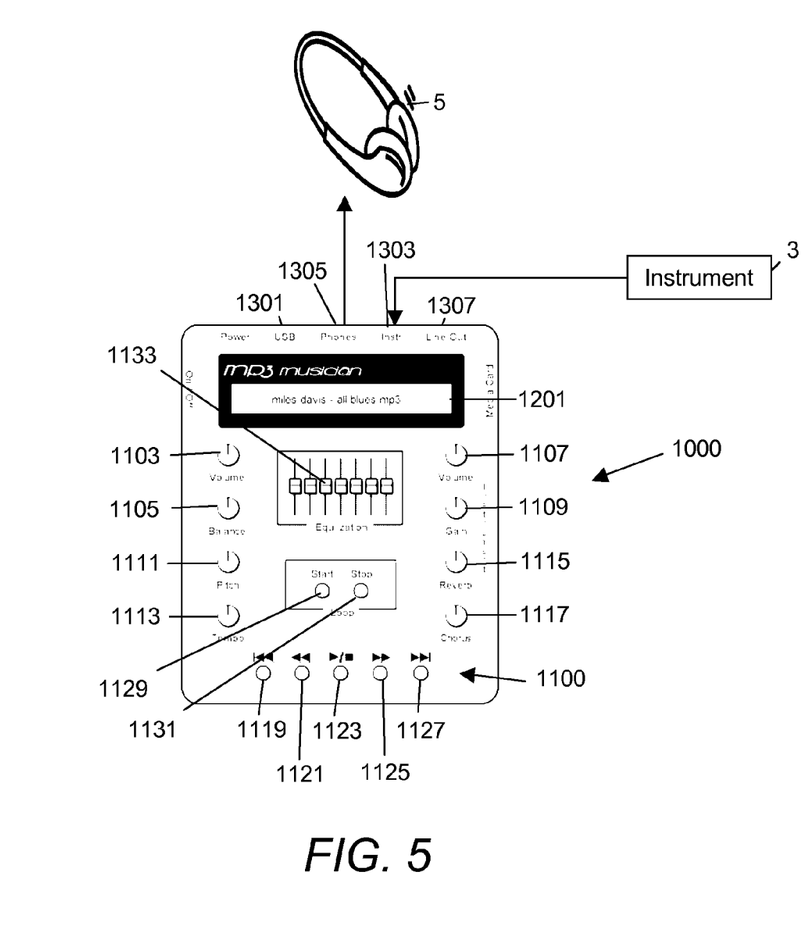
FIG. 5 is a perspective view of one embodiment of a portable sound processing device connected to a musical instrument and headphones according to the present invention.

FIG. 5 is a perspective view of one embodiment of a portable sound processing device 1000 according to the present invention connected to an instrument 3 and playback headphones 5. The instrument connects to instrument input 1303. The headphones 5 connect to the phones output 1305.

This embodiment of the portable sound processing device 1000 has internal stored pre-recorded sounds or music. The music is stored on a removable flash memory card, small hard drive or digital non-volatile memory. In another embodiment the music may originate from a PDP. This may be compressed in various formats including MP3 format.

Portable sound processing device receives a signal from instrument 3 through input 1303 and is mixed with the pre-recorded music as it is being played. The output of portable sound processing device passes out of headphones output 1305 and line-output 1307.

The volume of the music may be altered by a music volume control 1103, 1107 and an instrument volume control.

Feedback to the user may be displayed on a display 1201.

The pitch and the tempo of the music may be adjusted with user controls 1111 and 1113.

The gain, reverb and chorus of the instrument may be adjusted using gain, reverb and chorus controls 1109, 1115, 1117 respectively. In another embodiment shown in FIG. 7, the instrument effects (including distortion, delay, reverb, chorus, pitch control and waveshaping) may be adjusted with user controls 1118, 1120 and 1122.

In FIG. 5, the music may be played or stopped when a user toggles play button 1123. The user may skip forward to the next section with the fast forward button 1127. Similarly, the user may skip backward to the previous section with fast reverse button 1119. The user may also listen to the music in a fast forward scan by pressing button 1125. And the user may listen to the music played in a fast reverse scan by pressing button 1121.

The user may start playing and repeating a defined portion of the music as a loop by pressing the loop start button 1129. The user may end playing the repeated loop section by pressing button 1131.

Alternatively, any common input device which provides this information from the user to the system, including a touch screen, is considered within the scope of the present invention.

Collectively, all of the above input buttons and knobs are referred to as user controls 1100.

Figure 6:
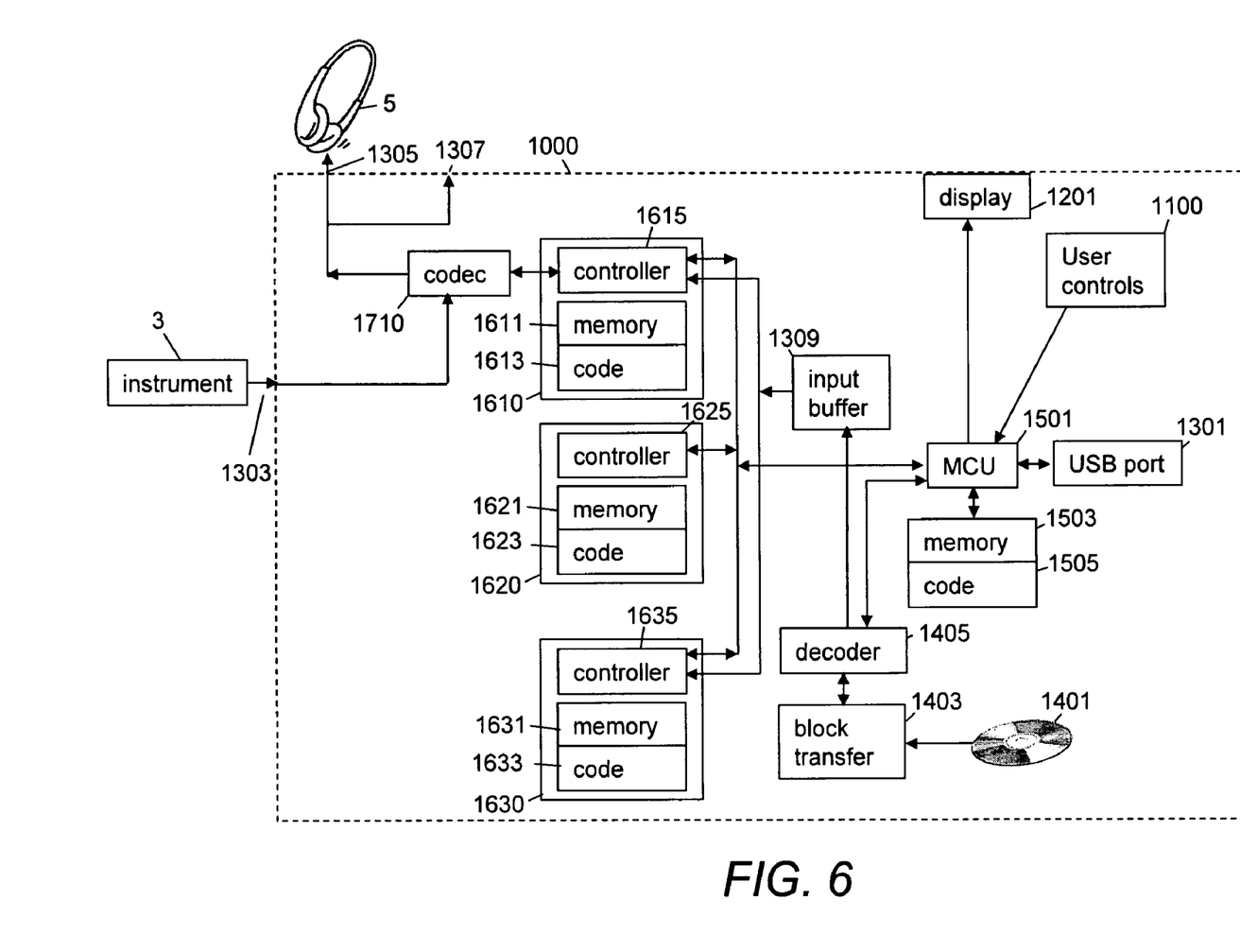
FIG. 6 is a simplified block diagram of the portable audio player of FIG. 5 according to one embodiment of the present invention.

FIG. 6 is a simplified block diagram of the portable sound processor of FIG. 5 according to one embodiment of the present invention.

The pre-recorded sounds or music are stored on a storage device 1401. This storage device may be a CD, DVD, removable flash memory card, hard drive or memory chip. In another embodiment the music may originate from an ipod-like device.

A block transfer device 1403 reads blocks of data from storage device 1401. A decoder 1405 unpacks the data and loads the data into an input buffer 1309. An MCU (micro controller) 1501 is connected to the decoder 1405, and receives status from and controls decoder 1405.

Memory 1503 has a section with stored executable code 1505 for MCU 1501. This has the instructions on how to drive display 1201 to prompt the user on the user's options. MCU 1501 also receives input from the user controls 1100.

Alternatively, the executable code 1505 for MCU 1501 may be ROM, or 'flash memory'.

The executable code includes instructions allowing the MCU to display information to a user on a display 1201, and then receive responses from the user through user controls 1100.

Signals from instrument 3 pass into instrument input 1303 to a codec 1710 which may include an analog to digital converter. The digitized signal is passed by a digital audio interface (DAI) 1713 to port 2 1617 of DSP 0 1610.

At least one of the digital signal processor (DSPs) 1610, 1620, 1630 receives data from the input buffer 1309. In this embodiment, there are three DSPs shown here, representing a left and right channel of a stereo signal. The last DSP represents a subwoofer signal.

Each DSP 1610, 1620, 1630 has a DSP memory 1611, 1621, 1631, a controller 1615, 1625, 1635 and executable DSP code 1613, 1623, 1633 stored in each memory of the controllers 1615, 1625, 1635.

Each of the controllers 1615, 1625, 1635 runs the executable code stored in DSP memory 1611, 1621, 1631 to process the signals provided to it as described above. They may adjust tempo or adjust pitch. The DSPs 1610, 1620, 1630 may sample input from an instrument and identify its spectrum and analyze the musical signal to determine when that instrument is playing and extract or subtract out that signal.

Stored DSP code 1613, 1623, 1633 may include DSP algorithms and software routines used to achieve analysis, modification and resynthesis of the musical (PCM) samples output by the decoder 1405. Decoder 1405 may be an MP3 decoder. These algorithms may include windowing, Fourier analysis, frequency and/or time domain filtering, a phase vocoder and oscillator bank resynthesis.

The DSPs 1610, 1620, 1630 may also perform other signal processing effects on the instrument input signal such as adding distortion, delay, reverberation, chorus, pitch control and waveshaping. Waveshaping may incorporate predefined and/or user-defined wavetables.

The DSP memory 1611, 1621, 1631 may be 'flash' memory which may be flashed to be reprogrammed. Since the functioning of each DSP 1610, 1620, 1630 is defined by the stored code, it may be upgraded to perform different types of signal processing or sound shaping.

After being reprocessed by the DSPs 1610, 1620, 1630, the resulting digital signals will be converted by a codec into analog signals output to the headphone output 1305 or a line output 1307. This analog signal may also be further amplified to drive audio speakers.

It is understood that any number of DSP branches may be used, depending upon the number of sound channels being processed. For example, 6 branches would be used to process 5.1 channel sound.

The portable sound processing device 1000 is preferably designed to have a rechargeable battery. It may also have a USB port.

Figure 7:
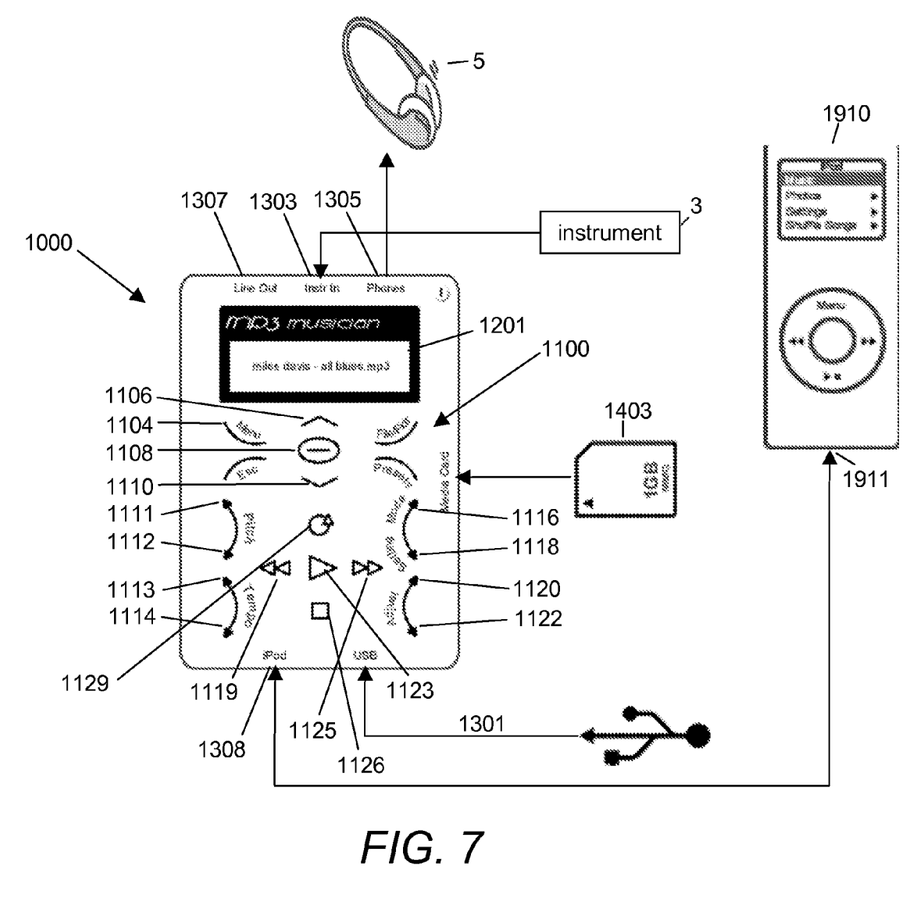
FIG. 7 is a perspective view of another embodiment of a portable sound processing device connected to a musical instrument, headphones and an ipod-like device according to the present invention.

FIG. 7 is a perspective view of another embodiment of a portable sound processing device 1000 according to the present invention connected to an instrument 3, playback headphones 5 and a portable digital player (PDP) 1910, such as an iPod sold by the Apple, Inc. The instrument 3 connects to instrument input 1303. The headphones 5 connect to the phones output 1305. The PDP 1910 connects to the external device port 1308.

This embodiment of the portable sound processing device 1000 may have internal stored pre-recorded sounds or music, or external stored pre-recorded sounds or music located on PDP 1910. The music may be stored in internal memory, on a small hard drive or other digital non-volatile internal memory, or externally on a removable flash memory card, or on a PDP 1910. This may be compressed in various formats including MP3 format.

Portable sound processing device 1000 receives a signal from instrument 3 through input 1303 and is mixed with the prerecorded music as it is being played. The output of portable sound processing device passes out of headphones output 1305 and line output 1307.

The volume of the music may be altered by music volume controls and an instrument volume control.

Feedback to the user may be displayed on a display 1201.

The pitch of the music may be adjusted up with user control 1111 and down with user control 1112. The tempo of the music may be sped up with user control 1113 and slowed down with user control 1114.

In the embodiment shown in FIG. 7, the instrument effects (including distortion, delay, reverb, chorus, pitch control and wave shaping) may be adjusted with user controls 1116, 1118, 1120 and 1122. Together, buttons 1104, 1106, 1108, 1110 may be used to navigate through various options provided to the user on display 1201 and to select the desired options.

The music may be played with button 1123 and paused or stopped with button 1126. The user may skip forward to the next song with button 1125. Similarly, the user may skip backward to the previous song with button 1119. The user may also listen to the music in a fast forward scan by pressing and holding button 1125. And the user may listen to the music played in a fast reverse scan by pressing and holding button 1119.

The user may start playing and repeating a defined portion of music as a loop by pressing button 1129 a first time to mark the beginning of the section, and by pressing button 1129 a second time to mark the end of the section and begin playback of the loop. The user may end looping the defined section of music by pressing button 1129 a third time or by pressing button 1126.

Alternatively, any common input device which provides this information from the user to the system, including a touch screen are considered within the scope of the present invention.

Collectively, all of the above input buttons and knobs are referred to as user controls 1100.

Figure 8:
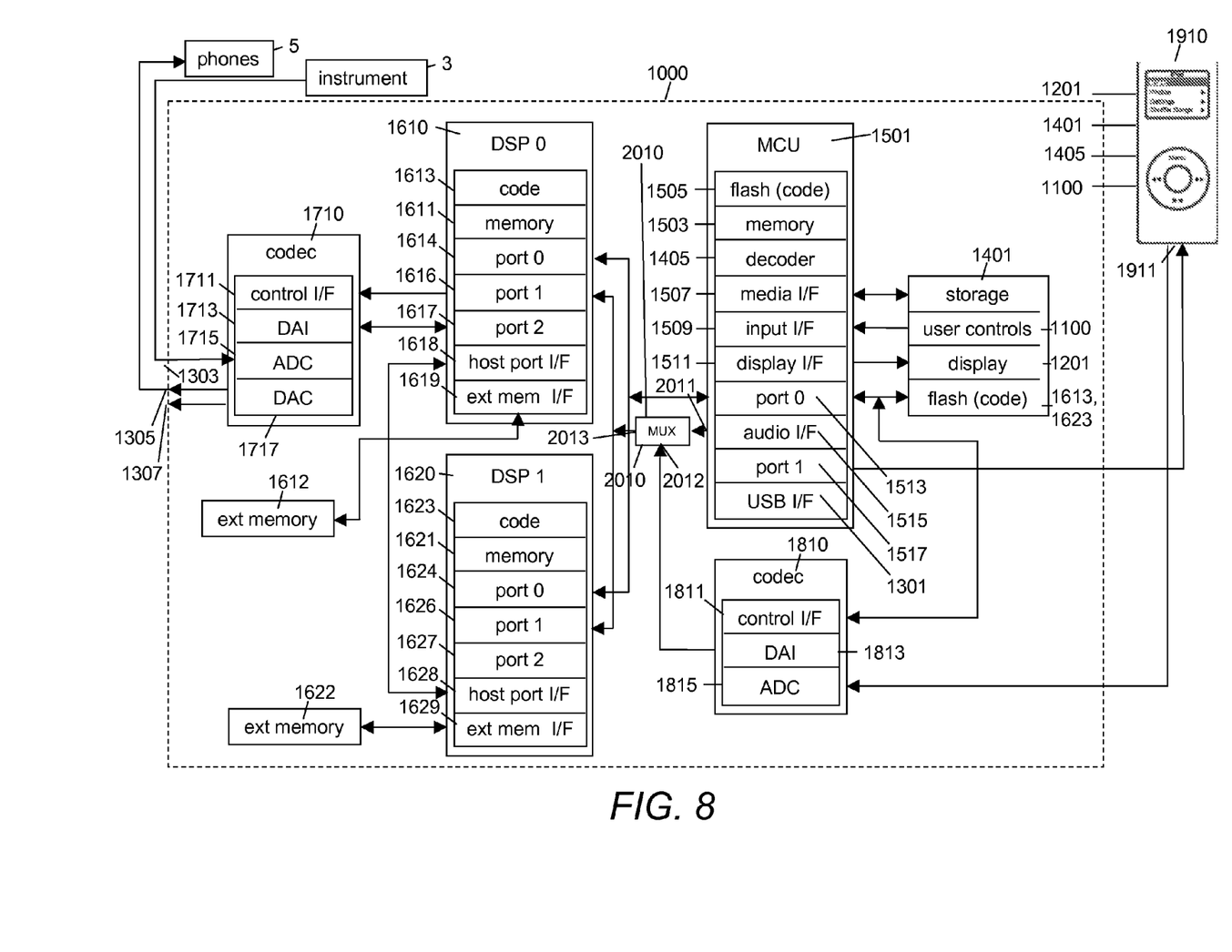
FIG. 8 is a simplified block diagram of the portable audio player of FIG. 7 according to one embodiment of the present invention. This diagram shows support for a stand alone player and connectivity for external devices similar to an ipod.

FIG. 8 is a simplified block diagram of the portable sound processing device 1000 of FIG. 7 according to another embodiment of the present invention.

The pre-recorded sounds or music are stored on a storage device 1401. This storage device may be located internally (removable flash memory card, hard drive or memory chip) or externally in PDP 1910. The source of the music (internal or external) may be selected manually with user controls 1100 or automatically (in firmware) by checking for the presence of an external device connected to port 1517. If an external device is connected to port 1517 the music source is assumed to be external, otherwise the music source is assumed to be internal.

When the source of music is internal, MCU (micro controller) 1501 reads blocks of data from storage device 1401. A decoder 1405 is fed frames of data, decodes them and outputs the decoded samples through the audio output interface 1515 to a multiplexer 2010. The MCU 1501 is connected to the decoder 1405, and receives status from and controls decoder 1405.

When the source of music is external, MCU 1501 initializes and controls codec 1810 via port 1513 and control interface 1811. Codec 1810 receives analog music from external device 1910's accessory port 1911 and digitizes the signal via ADC 1815. The codec 1810 sends digital output from digital audio interface 1813 to a multiplexer 2010.

Multiplexer (MUX) 2010 has two selectable inputs, 2011 and 2012. Input 2011 is connected to MCU 1501's audio output interface 1515 and input 2012 is connected to codec 1810's digital audio interface. Input 2011 is selected when the source of music is internal, and input 2012 is selected when the source of music is external. MUX 2010 has one output 2013 which is connected to at least one DSP input port 1616, 1626.

MCU 1501 has program/code memory 1505 and RAM 1503. The code has instructions on how to drive display 1201 to prompt the user on the user's options. MCU 1501 also receives input from the user controls 1100.

Alternatively, the executable code 1505 for MCU 1501 may be ROM, or 'flash memory'.

The executable code includes instructions allowing the MCU to display information to a user on a display 1201, and then receive responses from the user through user controls 1100.

Signals from instrument 3 pass into instrument input 1303 to a codec 1710 with an ADC input to a DSP 1610.

At least one of the digital signal processors (DSPs) 1610, 1620 receives data from the multiplexer 2010. In this embodiment, there are two DSPs shown here, representing a left and right channel of a stereo signal.

Each DSP 1610, 1620 has internal RAM 1611, 1621, code memory 1613, 1623, and may have external memory 1612, 1622. Some of the DSP code memory 1613, 1623 may be external flash ROM.

Each DSP runs the code stored in memory 1613, 1623 to process the signals provided to it as described above. They may adjust tempo or adjust pitch. An example would be to adjust pitch up to an octave upward or downward. The DSPs 1610, 1620 may sample input from an instrument and identify its spectrum and analyze the musical signal to determine when that instrument is playing and extract or subtract out that signal.

Stored DSP code 1613, 1623 may include DSP algorithms and software routines used to achieve analysis, modification and resynthesis of the musical (PCM) samples output by the decoder 1405. Decoder 1405 may be an MP3 decoder. These algorithms may include windowing, Fourier analysis, frequency and/or time domain filtering, a phase vocoder and oscillator bank resynthesis.

The DSPs 1610, 1620 may also perform other signal processing effects on the instrument input signal such as adding distortion, delay, reverberation, chorus, pitch control and wave shaping. Wave shaping may incorporate predefined and/or user-defined wavetables.

The DSP memory 1613, 1623 may be 'flash' memory which may be flashed to be reprogrammed. Since the functioning of each DSP 1610, 1620 is defined by the stored code; it may be upgraded to perform different types of signal processing or sound shaping.

After being reprocessed by the DSPs 1610, 1620 the resulting digital signals will be passed to a digital audio interface (DAI) 1715 of a codec 1710 for conversion. DSP 0 1610 controls codec 1710 through a control interface (control I/F) 1711.

A digital to analog converter (DAC) 1717 coverts the digital signals into analog signals output to the headphone output 1305 or a line output 1307. This analog signal may also be further amplified to drive audio speakers.

It is understood that any number of DSP branches may be used, depending upon the number of sound channels being processed. For example, 6 branches would be used to process 5.1 channel sound.

The portable sound processing device 1000 is preferably designed to have a rechargeable battery. It may also have a USB port.

Figure 9:
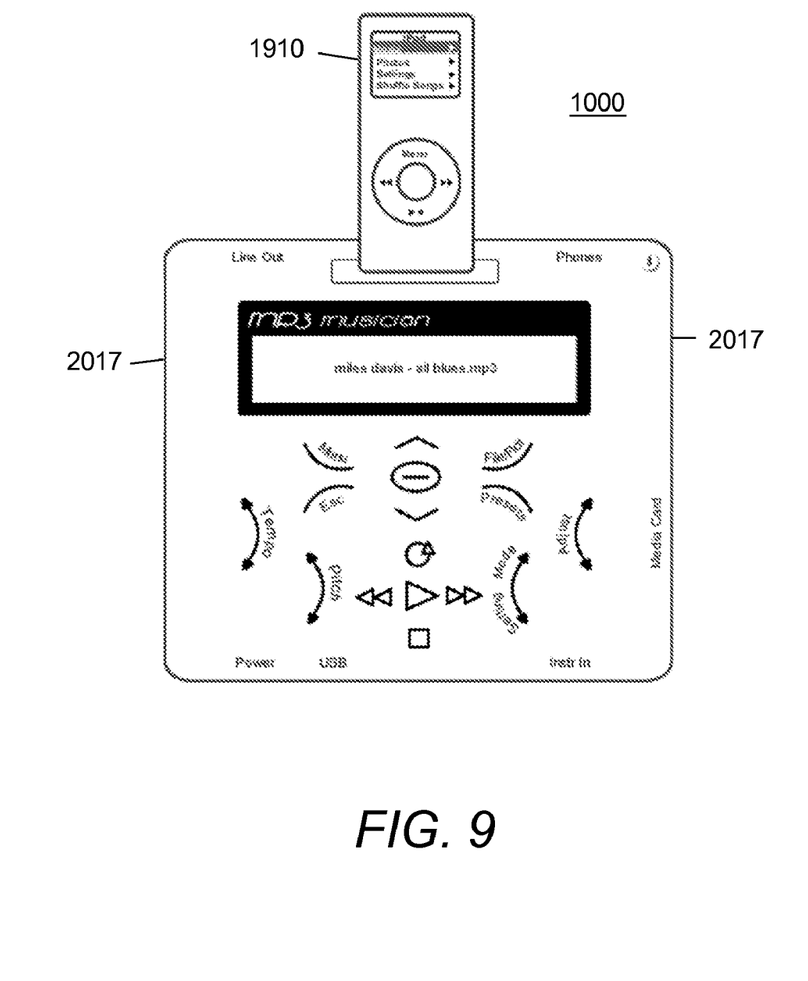
FIG. 9 shows an alternative embodiment of the present invention.

FIG. 9 shows an alternative embodiment of the present invention 1000. It may provide an interface 2015 to PDPs 1910 such as the accessory port connection on the bottom of the iPod sold by Apple, Inc., allowing owners of these devices to use the portable sound processing device 1000 as an "add-on" product. This will extend the functionality of the PDP to include all features mentioned herein. The interface to PDPs 1910 may be built directly into the processor 1000 as shown in FIG. 9. The processor 1000 may also contain built-in speakers 2017 as shown in FIG. 9.

The processor 1000 may also provide external interfaces to other stereo components or audio-visual devices (such as those containing RCA jacks or HDMI connectors), allowing owners of these devices to use the processor 1000 as an "add-on" product to extend the device's functionality to include all features mentioned herein.

Figure 10:
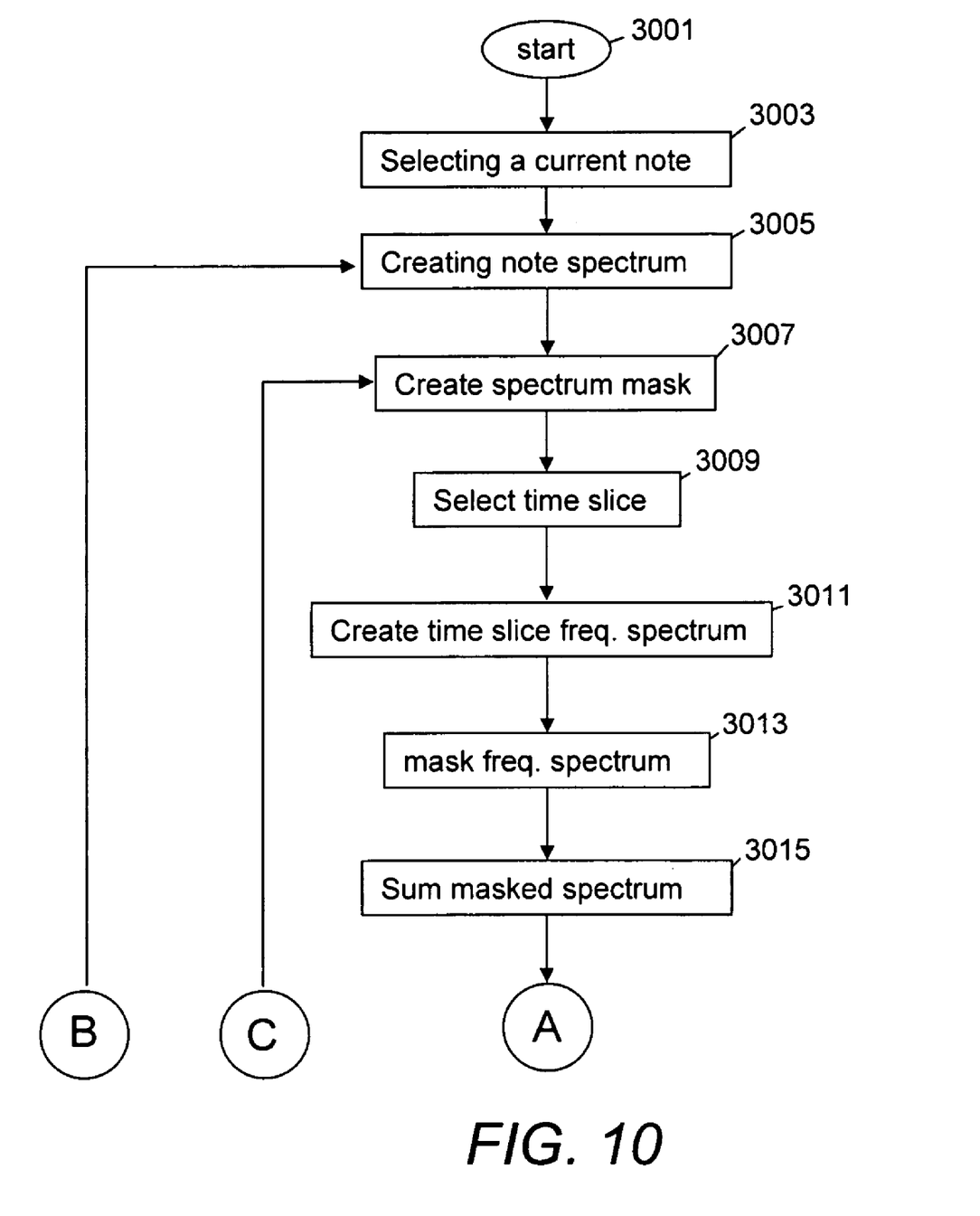
FIGS. 10 and 11 together are a single flowchart showing a method of identifying notes played by a musical instrument in pre-recorded music.
Figure 11:
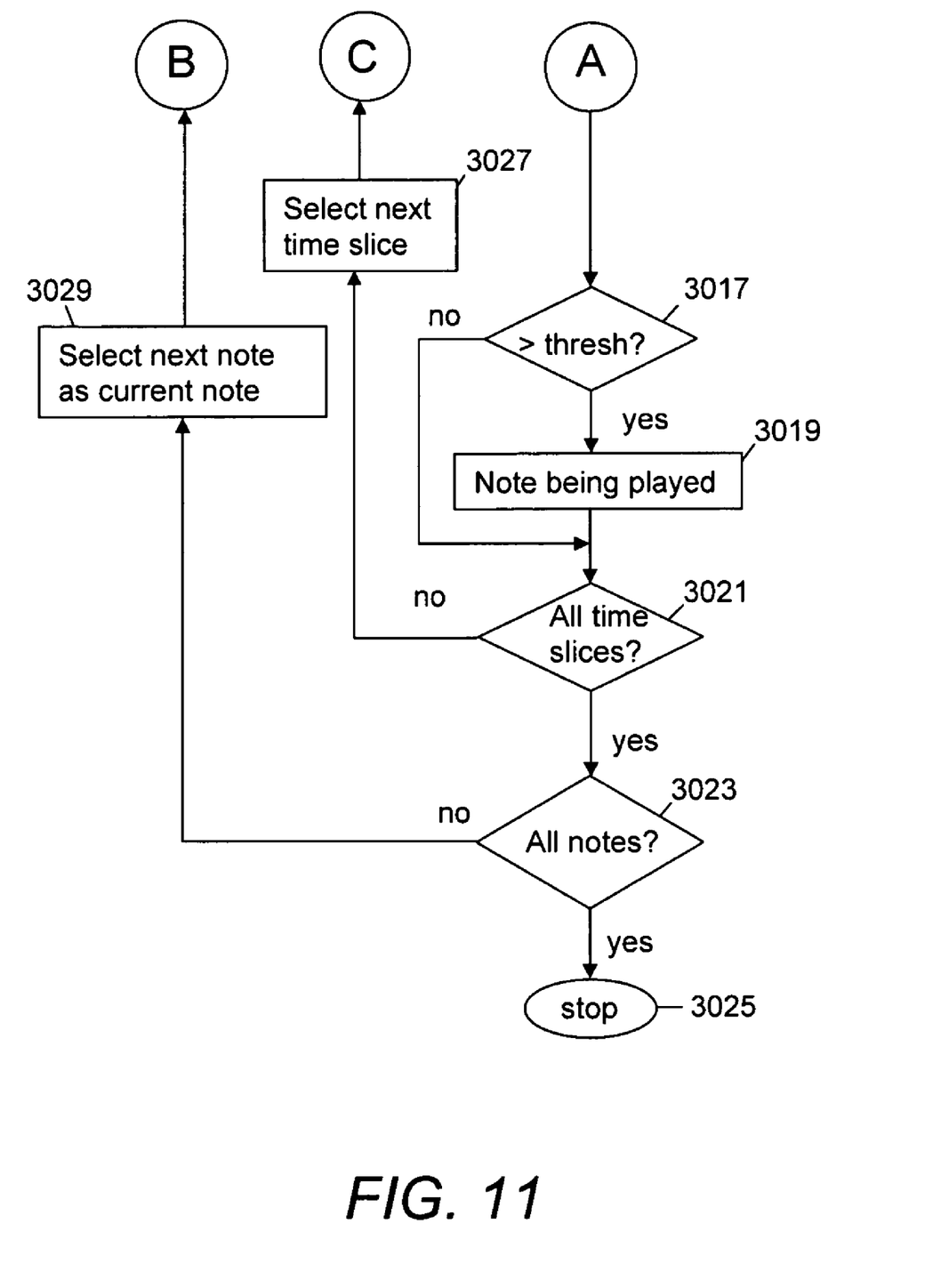

FIG. 10 and 11 together are a single flowchart showing a method of identifying notes played by a musical instrument [3] in pre-recorded music.

The process starts at step 3001. In step 3003 a current note of the instrument 3 is selected to be checked through the music.

In step 3005 a frequency spectrum is identified for said instrument for the current note.

In step 3007 a spectrum mask is created from the frequency spectrum which passes frequencies where there is an amplitude in the note spectrum greater than a predetermined amplitude;

In step 3009 a 'time slice' being a specific instant in time of the prerecorded music is selected for analysis.

In step 3011 a frequency spectrum for the time slice is created.

In step 3013, the frequency spectrum for the time slice is masked with the spectrum mask.

In step 3015, the amplitudes of the masked spectrum are summed.

The processing continues in FIG. 11.

In step 3017, the sum of the amplitudes of the masked spectrum is compared to a predetermined threshold.

If the sum is greater than the predetermined threshold, then an indication is made in step 3019 that the instrument is playing the current note during this time slice. This indication is stored.

A determination is made in step 3021 that all time slices have been processed. If so, processing continues at step 3023.

If not, then the next time slice is selected in step 3027 and the process continues at step 3007.

In step 3023, a determination is made if all desired notes have been processed. If so, the process stops at step 3025.

If not, a next note is selected in step 3029 and the process continues at step 3005.

This results in a determination of which notes of the instrument are being played during each time slice of the prerecorded music.

In an alternative embodiment, the present invention may be a method of highlighting or dimming a specific musical instrument [3] in pre-recorded music.

This occurs by pre-calculating and storing (in firmware) multiple band pass filters for each known musical instrument to allow highlighting or dimming of these instruments in pre-recorded music.

Each of these "instrument filters" are given a name so they may be easily summoned by the user.

Each original input frame is filtered with the instrument filter(s) designed to pass particular frequency bands.

User-adjustable decibel gains are applied to each band's filtered result to boost or attenuate the band(s) representing the particular instrument's fundamental frequency range and/or its harmonic range.

The final results are summed to produce a filtered version of the original input frame with the specified instrument being highlighted or dimmed.

The input device may include a pitch adjust control, a tempo adjust control, a loop start control, a loop stop control.

External interfaces are provided to other stereo components or audio-visual devices (such as those containing RCA jacks or HDMI connectors), allowing owners of these devices to use the processor 1000 as an "add-on" product to extend the device's functionality to include all features mentioned herein.

The above embodiment is presented for illustration purposes, however, many different embodiments could be employed which are variations of the present invention and all fall under the scope of this application.

I claim:

1. A portable sound processing device [1000] adapted to retrofit a portable digital player (PDP) [1910] with pre-recorded sounds comprising:
   a) a first codec [1810] for receiving a PDP signal from said PDP [1910] playing the pre-recorded sounds;
   b) a storage device [1401] having stored pre-recorded sounds;
   c) a multiplexer device (MUX) [2010] coupled to the first codec and the storage device [1401] for selecting the PDP signal or a signal derived from the pre-recorded sounds on the storage device 1401, and producing a MUX signal;
   d) a display [1201] for displaying information to a user;
   e) a plurality of input device [1100] for receiving input from the user;
   f) a second codec [1710] for receiving analog input from a musical instrument, converting it to a digital signal, and converting the final mixed digital output to an analog signal;

g) at least one digital signal processor (DSP) [1610] coupled to MUX [2010] for receiving the MUX signal and for receiving the instrument signal and for digitally processing these signals into a processed signal;

h) a master controller unit coupled to the MUX, storage [1401], PDP [1910] and DSPs [1610, 1620], the user controls [1100] and the display [1201], adapted to interactively:
  i. operate the display [1201] to indicate choices to a user;
  ii. receive input from the user controls [1401] indicating choices of the user;
  iii. operate the MUX [2010] to select a signal indicated by user input;
  iv. operate the DSPs [1610, 1620] to perform a desired signal processing to signals provided to them and play the processed signal.

2. The portable sound processing device [1000] of claim 1, wherein the DSPs 1610, 1620 further comprise:
  a) a memory 1611, 1621 for storing the signal received by the DSPs 1610, 1620;
  b) executable code 1613, 1623 stored in the DSPs 1610, 1620 defining digital signal processing steps to be performed on the stored digital signal.

3. The portable sound processing device [1000] of claim 1, wherein the executable code [1613, 1623] is adapted to adjust the tempo of at least a portion of the stored digital signal without altering its pitch.

4. The portable sound processing device [1000] of claim 1, wherein the executable code [1613, 1623] is adapted to adjust pitch of at least a portion of the stored digital signal without changing its playback speed.

5. The portable sound processing device [1000] of claim 1, wherein the executable code [1613, 1623] is adapted to perform looping by replaying sections of the stored digital signal defined by user input.

6. The portable sound processing device [1000] of claim 1, wherein the storage device [1401] may be removeable flash card media.

7. The portable sound processing device [1000] of claim 1, wherein the executable code [1613, 1623] is stored in a flash memory such that the code may be changed to upgrade or change the performance of the DSP.

\* \* \* \* \*